(12) United States Patent
Thornhill et al.

(10) Patent No.: US 8,038,132 B2
(45) Date of Patent: Oct. 18, 2011

(54) HYDRAULIC BUSHING

(75) Inventors: Jay Thornhill, Huron, OH (US); Robert Goudie, North Ridgeville, OH (US); Richard Butch Brown, Suzhou (CN); Mark Morman, Napoleon, OH (US); Bill Burk, Angola, IN (US); Hal Henry, Huron, OH (US); Daniel Wittler, Temperance, MI (US); Robert Ferguson, Milner, GA (US); David Stewart, Fremont, IN (US); Andrew Franzen, Sandusky, OH (US); David Baker, Vermillen, OH (US)

(73) Assignee: The Pullman Company, Milan, OH (US)

( * ) Notice: Subject to any disclaimer, the term of this patent is extended or adjusted under 35 U.S.C. 154(b) by 1120 days.

(21) Appl. No.: 11/507,313

(22) Filed: Aug. 21, 2006

(65) Prior Publication Data

US 2007/0045918 A1    Mar. 1, 2007

Related U.S. Application Data

(60) Provisional application No. 60/713,543, filed on Sep. 1, 2005.

(51) Int. Cl.
*F16F 13/00*    (2006.01)
(52) U.S. Cl. .................. 267/140.12; 267/141.2
(58) Field of Classification Search ............. 267/140.12, 267/141.2, 293
See application file for complete search history.

(56) References Cited

U.S. PATENT DOCUMENTS

| | | | |
|---|---|---|---|
| 4,895,353 A | 1/1990 | Roth et al. | |
| 4,944,482 A | 7/1990 | Bouhier et al. | |
| 5,221,077 A * | 6/1993 | Noguchi | 267/140.12 |
| 5,397,112 A | 3/1995 | Roth et al. | |
| 5,496,018 A | 3/1996 | McLelland et al. | |
| 5,954,317 A * | 9/1999 | Meyer et al. | 267/140.12 |
| 6,364,298 B1 * | 4/2002 | Vossel et al. | 267/293 |
| 6,511,058 B1 * | 1/2003 | Vossel et al. | 267/140.12 |
| 6,666,437 B2 * | 12/2003 | Larmande et al. | 267/141.2 |
| 6,729,224 B1 | 5/2004 | Roy | |
| 7,219,882 B2 * | 5/2007 | Kato | 267/140.12 |
| 2003/0201590 A1 | 10/2003 | Thornhill | |

OTHER PUBLICATIONS

Office Action dated Mar. 20, 2009 in corresponding Chinese patent application No. 200680031680.7 with English translation.

* cited by examiner

*Primary Examiner* — Bradley King
(74) *Attorney, Agent, or Firm* — Harness, Dickey & Pierce, PLC

(57) ABSTRACT

A hydraulic bushing assembly includes an inner tube, an elastomeric bushing disposed around the inner tube, an insert disposed around the elastomeric bushing and an outer tube disposed around the insert. The elastomeric bushing and the insert define a pair of chambers which are connected by a passageway defined by the insert. A pair of intermediate tubes are disposed in the elastomeric bushing at opposite axial ends of the insert.

7 Claims, 5 Drawing Sheets

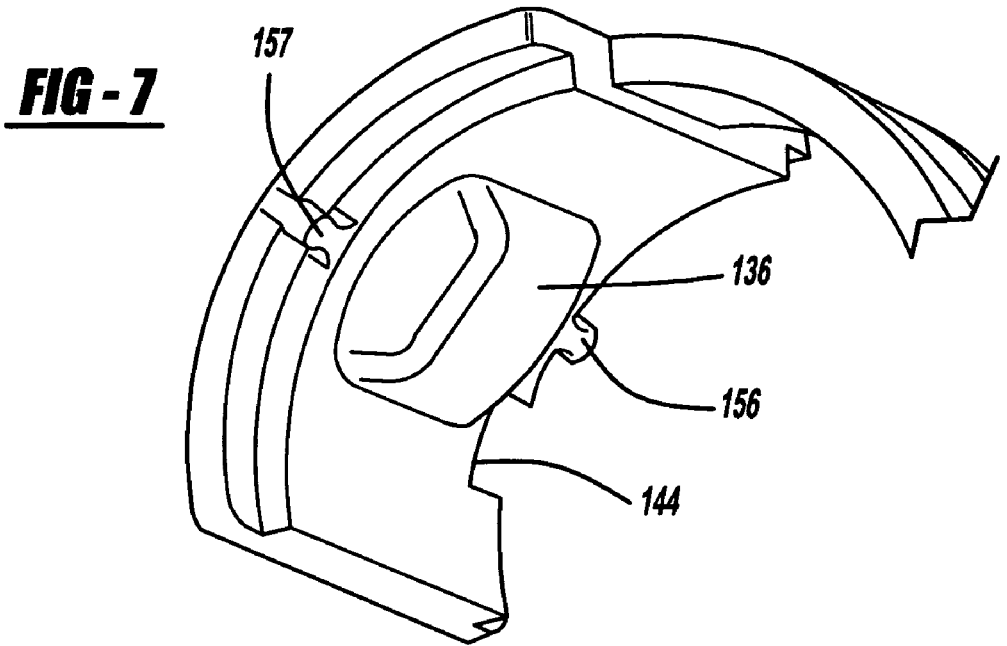
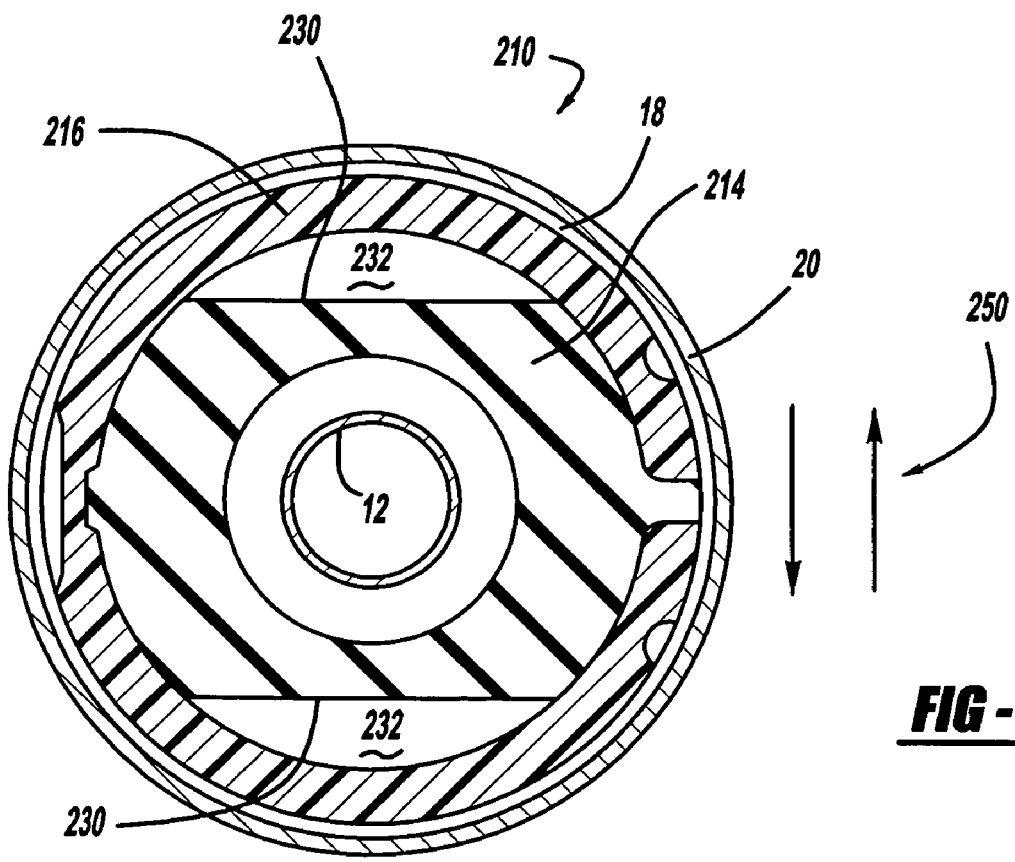

HYDRAULIC BUSHING

CROSS-REFERENCE TO RELATED APPLICATIONS

This application claims the benefit of U.S. Provisional Application Ser. No. 60/713,543, filed on Sep. 1, 2005. The disclosure of the above application is incorporated herein by reference.

FIELD

The present invention relates to a hydraulic bushing. More particularly, the present invention relates to a hydraulic bushing that incorporates a two ring intermediate tube.

BACKGROUND

The statements in this section merely provide background information related to the present disclosure and may not constitute prior art.

Hydraulic bushings typically used in automobile suspensions are expected to damp low frequency large displacement oscillations as well as contribute to high frequency acoustic isolation from relatively small displacements. Hydraulic bushings typically have two hydraulic chambers connected by a channel. The resonance of the fluid in the channel creates a mass damper effect. A single piece intermediate tube is utilized in some designs to improve the durability of the bushing and to separate the working part of the elastomeric bushing where the loads are taken from the outer part of the elastomeric bushing where the channels are formed and the fluid sealing is provided for the fluid within the bushing.

Typically, the intermediate tube is only needed at the ends of the bushing and the center portion of the intermediate tube is used predominantly to provide an interconnection between the two end portions. The single piece intermediate tube is an expensive component that presents various difficulties during the assembly of the hydraulic bushing.

SUMMARY

A hydraulic bushing is disclosed which has two hydraulic chambers connected by a channel. The resonance of the fluid in the channel creates a mass damper effect. The hydraulic bushing uses two very short tubes which separate the inner or working part of the elastomeric bushing where the loads are taken from the outer part of the elastomeric bushing where the fluid within the channels and hydraulic chambers is sealed. The hydraulic bushing includes a retention system which maintains the position of the two short tubes within the hydraulic bushing.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 7 is a perspective view of the insert illustrated in FIG. 5;

FIG. 8 is an end view of a hydraulic bushing assembly in accordance with another embodiment of the disclosure;

DETAILED DESCRIPTION

Figure 1:
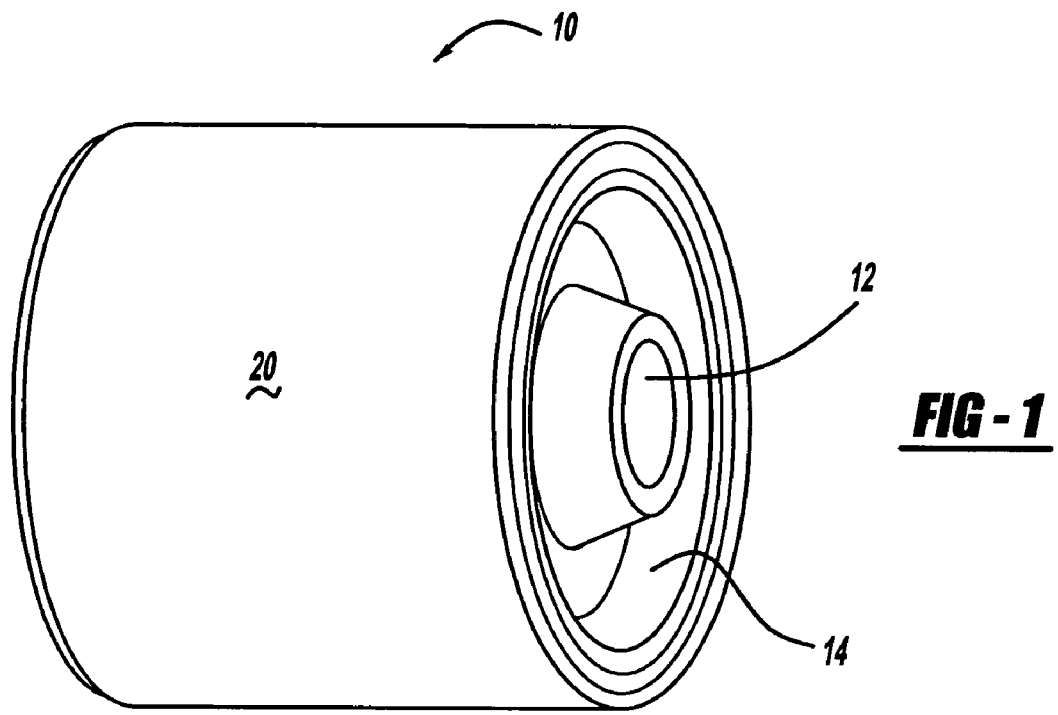
FIG. 1 is a perspective view of a hydraulic bushing assembly in accordance with one embodiment of the present disclosure.
Figure 2:
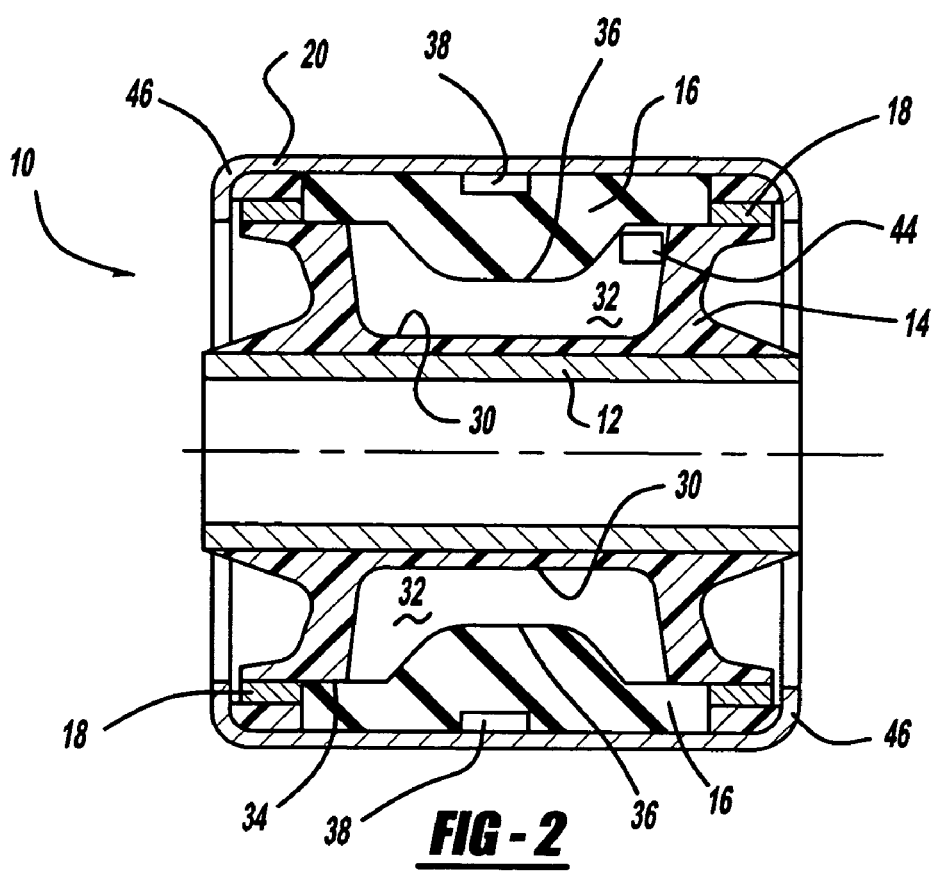
FIG. 2 is a cross-sectional view of the hydraulic bushing assembly illustrated in FIG. 1.
Figure 3:
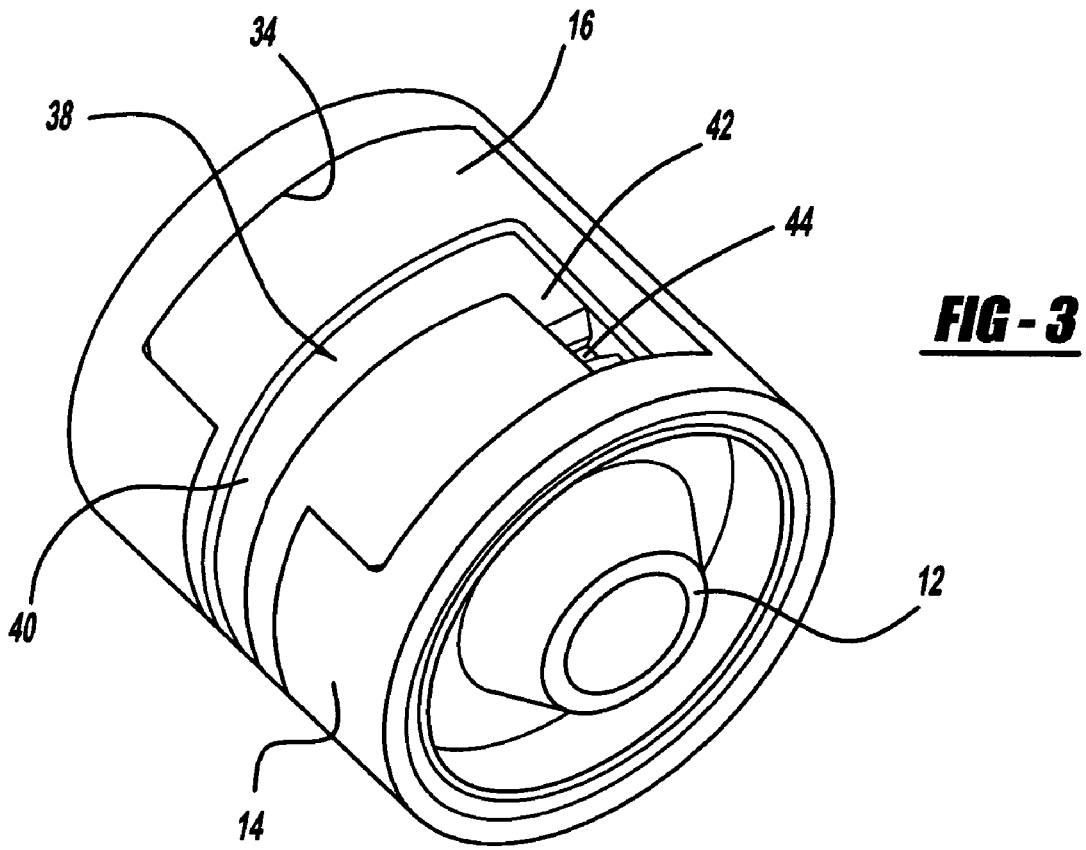
FIG. 3 is a perspective view of the insert in position on the elastomeric bushing illustrated in FIGS. 1 and 2.
Figure 4:
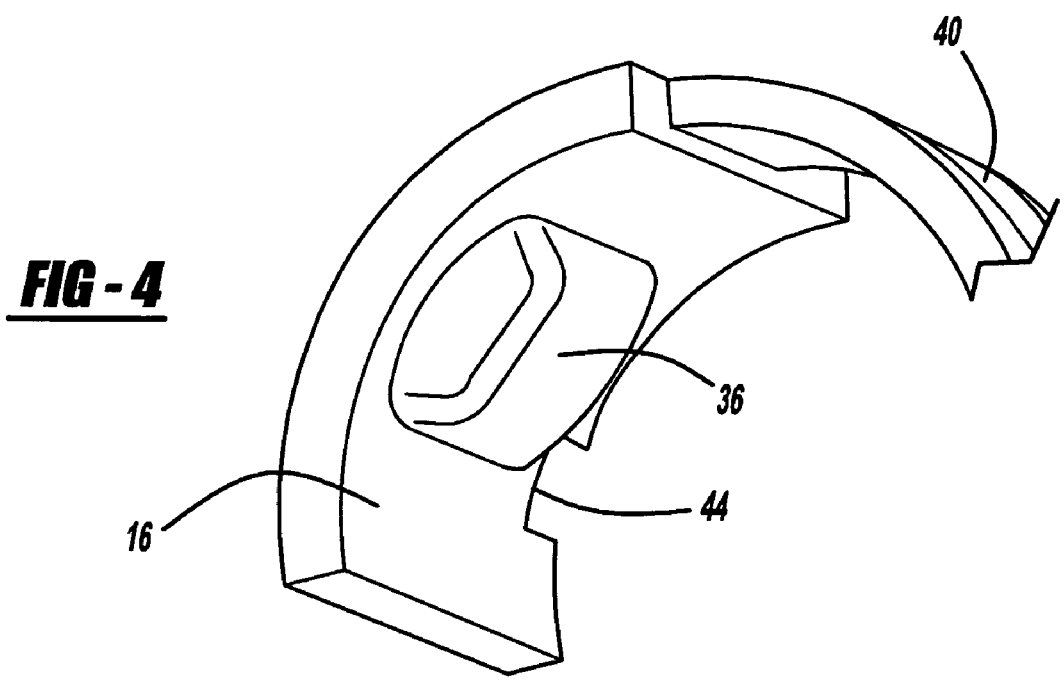
FIG. 4 is a perspective view of the insert illustrated in FIGS. 1-3.

The following description is merely exemplary in nature and is not intended to limit the present disclosure, application, or uses. There is illustrated in FIGS. 1-4 a hydraulic bushing assembly which is designated generally by the reference numeral 10. Hydraulic bushing assembly 10 comprises an inner tube 12, an elastomeric bushing 14, a pair of inserts 16, a pair of intermediate tubes 18 and an outer tube 20.

Elastomeric bushing 14 is located over inner tube 12 and can be secured to inner tube 12 by compression of elastomeric bushing 14 and the associated friction between elastomeric bushing 14 and inner tube 12; by being bonded to inner tube 12; or by any other means known in the art. Elastomeric bushing 14 defines a pair of voids 30 which with inserts 16 define a pair of fluid chambers 32. Elastomeric bushing 14 also defines a pocket 34 within which inserts 16 are located.

Each insert 16 is identical and the two inserts are positioned adjacent each other surrounding elastomeric bushing 14. Each insert defines a bump stop 36 and a fluid channel 38. Bump stop 36 limits the radial movement of inner tube 12 with respect to inserts 16 and outer tube 20. Channel 38 includes a circumferential portion 40, an axial portion 42 and a radial portion 44. Radial portion 44 is open to one of the fluid chambers 32 and circumferential portion 40 is in communication with circumferential portion 40 on the adjacent insert 16 which has its radial portion 44 in communication with the other fluid chamber 32. Thus, one fluid chamber 32 is in fluid communication with the opposite fluid chamber 32 through radial portion 44 of one insert 16, axial portion 42 of the one insert 16, circumferential portion 40 of the one insert 16, circumferential portion 40 of the other insert 16, axial portion 42 of the other insert 16 and radial portion 44 of the other insert 16. During deflection of hydraulic bushing assembly 10, the flow of the fluid between chambers 32 through channels 38 creates a mass damper effect for hydraulic bushing assembly 10.

Outer tube 20 is positioned over inserts 16 and elastomeric bushing 14. Outer tube 20 closes channels 38 of inserts 16 and elastomeric bushing 14 engages the inside surface of outer tube 20 to provide a seal for the fluid located within fluid chambers 32 and channels 38. The pair of intermediate tubes 18 are located within opposite end of elastomeric bushing 14 between inner tube 12 and outer tube 20. The ends of outer tube 20 are curled over as shown at 46 to trap each intermediate tube 18 between the curled end 46 and inserts 16. Intermediate tubes 18 separate the inner or working part of elastomeric bushing 14 where the loads are taken from the outer part of elastomeric bushing 14 which with the inside surface of outer tube 20 provides a fluid seal for hydraulic bushing assembly 10.

Figure 5:
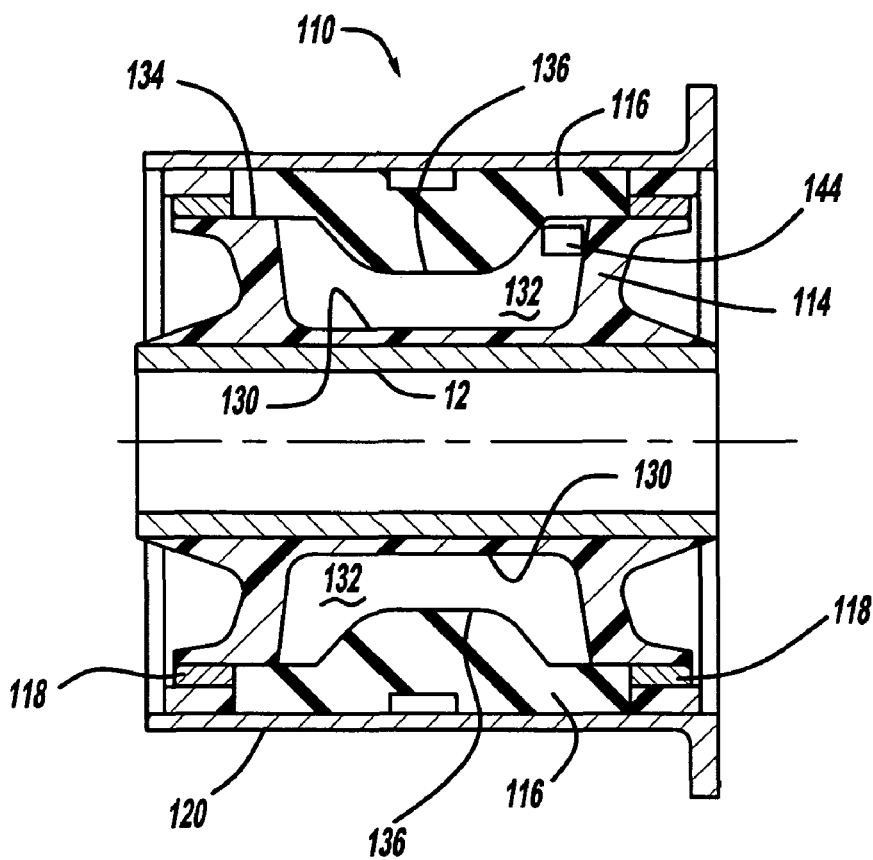
FIG. 5 is a cross-sectional view of a hydraulic bushing assembly in accordance with another embodiment of the present disclosure.
Figure 6:
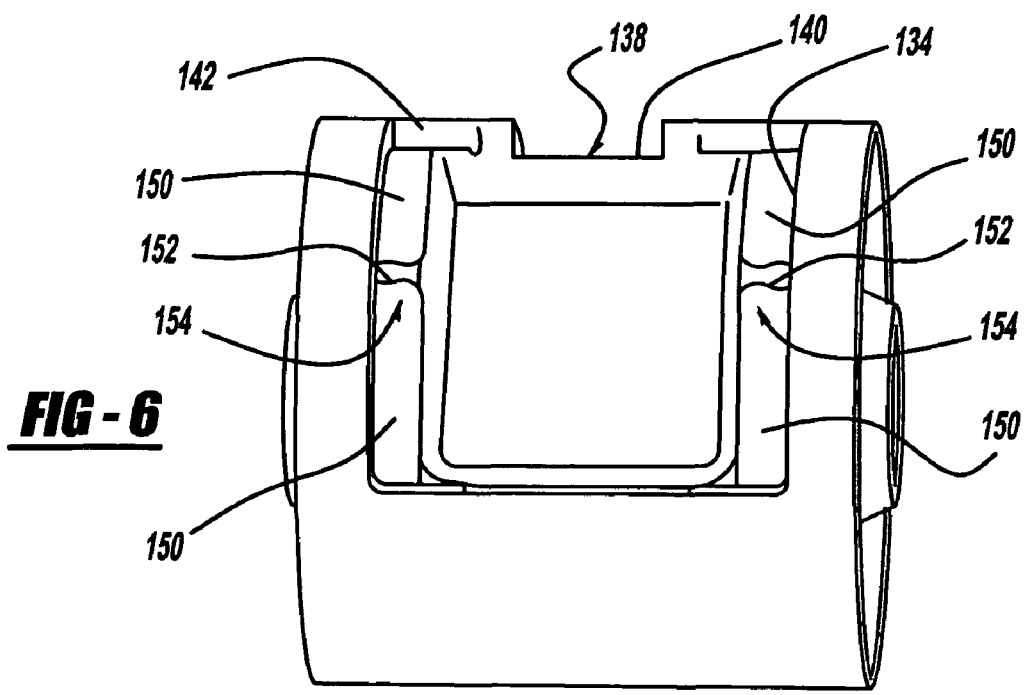
FIG. 6 is a perspective view of the intermediate tubes and elastomeric bushing illustrated in FIG. 5.

Referring now to FIGS. 5-7, a hydraulic bushing assembly 110 in accordance with another embodiment of the present disclosure is illustrated. Hydraulic bushing assembly 110 comprises inner tube 12, an elastomeric bushing 114, a pair of inserts 116, a pair of intermediate tubes 118 and an outer tube 120. Hydraulic bushing assembly 110 is the same as hydraulic bushing assembly 10 except that the curled ends shown at 46 for hydraulic bushing assembly 10 have been replaced with a retention system described below.

Elastomeric bushing 114 is located over inner tube 12 and can be secured to inner tube 12 by compression of elastomeric bushing 114 and the associated friction between elastomeric bushing 114 and inner tube 12; by being bonded to inner tube 12; or by any other means known in the art. Elastomeric bushing 114 defines a pair of voids 130 which with inserts 116 define a pair of fluid chambers 132. Elastomeric bushing 114 also defines a pocket 134 within which inserts 116 are located.

Each insert 116 is identical and the two inserts are positioned adjacent each other surrounding elastomeric bushing 114. Each insert defines a bump stop 136 and a fluid channel 138. Bump stop 136 limits the radial movement of inner tube 12 with respect to inserts 116 and outer tube 120. Channel 138 includes a circumferential portion 140, an axial portion 142 and a radial portion 144. Radial portion 144 is open to one of the fluid chambers 132 and circumferential portion 140 is in communication with circumferential portion 140 on the adjacent insert 116 which has its radial portion 144 in communication with the other fluid chamber 132. Thus, one fluid chamber 132 is in fluid communication with the opposite fluid chamber 132 through radial portion 144 of one insert 116, axial portion 142 of the one insert 116, circumferential portion 140 of the one insert 116, circumferential portion 140 of the other insert 116, axial portion 142 of the other insert 116 and radial portion 144 of the other insert 116. During deflection of hydraulic bushing assembly 110, the flow of the fluid between chambers 132 through channels 138 creates a mass damper effect for hydraulic bushing assembly 110.

Outer tube 120 is positioned over inserts 116 and elastomeric bushing 114. Outer tube 120 closes channels 138 of inserts 116 and elastomeric bushing 114 engages the inside surface of outer tube 120 to provide a seal for the fluid located within fluid chambers 132 and channels 138. The pair of intermediate tubes 118 are located within opposite end of elastomeric bushing 114 between inner tube 12 and outer tube 120.

Each intermediate tube 118 comprises a pair of tubular sections 150 which form a female portion 152 of a toggle lock 154. Each insert 116 defines a male portion 156 of toggle lock 154 at each side of each insert 116. When inserts 116 are assembled to elastomeric bushing 114 and intermediate tubes 118, male portion 156 of toggle lock 154 is positioned within female portion 152 of toggle lock 154. Once outer tube 120 is assembled over elastomeric bushing 114, intermediate tubes 118 and inserts 116, toggle locks 154 on each axial end of hydraulic bushing assembly 110 acts as means for retention of intermediate tubes 118 thus eliminating the need to curl the edges of outer tube 120 similar to that shown at 46 for outer tube 20 of hydraulic bushing assembly 10.

Intermediate tubes 118 separates the inner or working part of elastomeric bushing 114 where the loads are taken from the outer part of elastomeric bushing 114 which with the inside surface of outer tube 120 provides a fluid seal for hydraulic bushing assembly 110.

Figure 9:
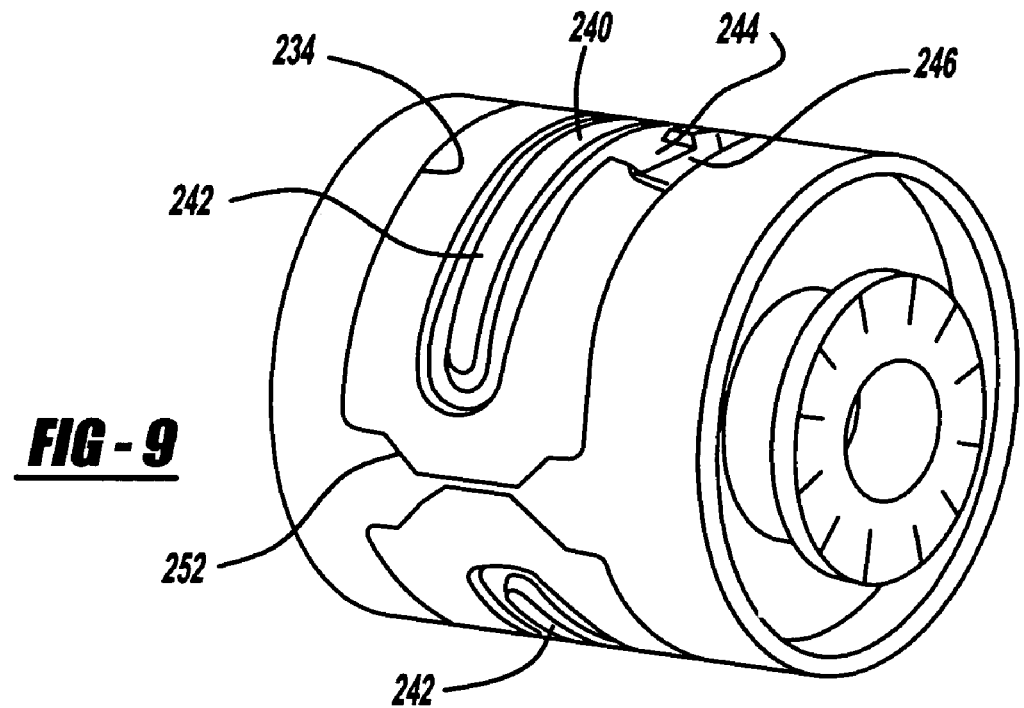
FIG. 9 is a perspective view of the insert and the elastomeric bushing illustrated in FIG. 8; and, FIG. 10 is a perspective view of the insert illustrated in FIG. 8.
Figure 10:
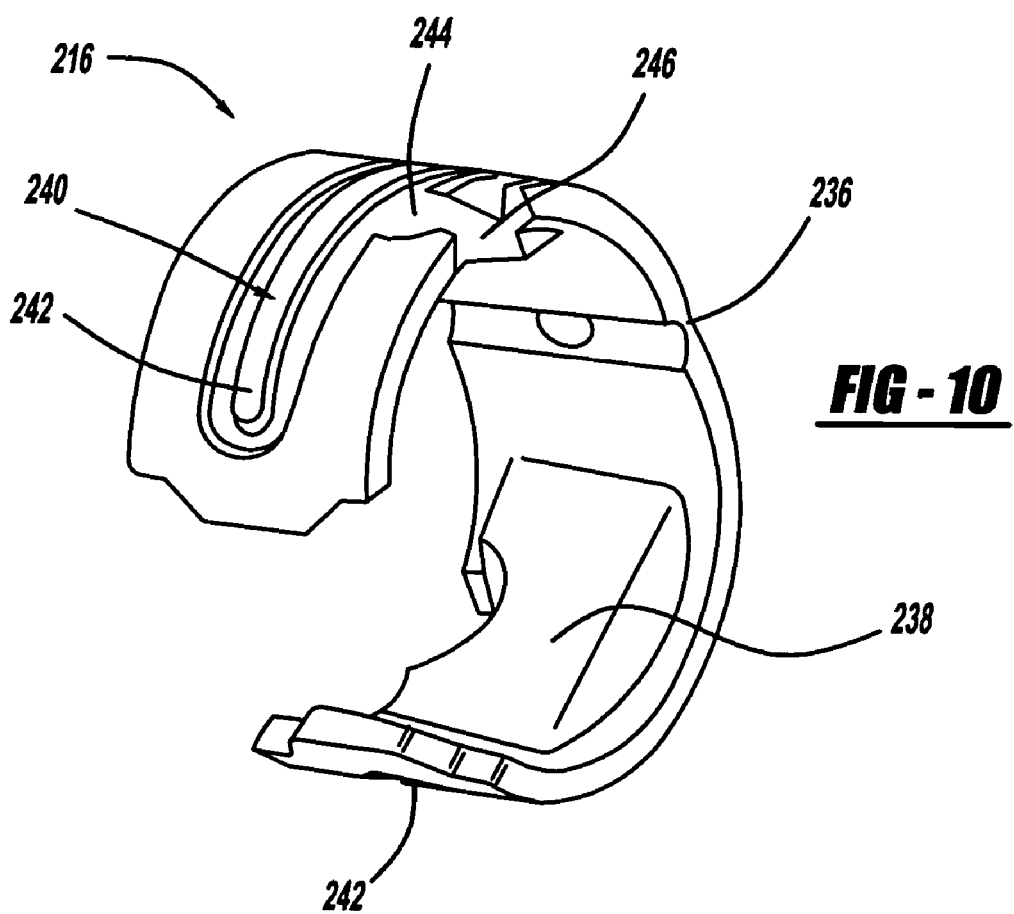

Referring now to FIGS. 8-10, a hydraulic bushing assembly 210 in accordance with another embodiment of the present disclosure is illustrated. Hydraulic bushing assembly 210 comprises inner tube 12, an elastomeric bushing 214, an insert 216, the pair of intermediate tubes 18 and outer tube 20. Hydraulic bushing assembly 210 is the same as hydraulic bushing assembly 10 except that the two inserts 16 have been replaced with a single piece insert 216 as described below.

Elastomeric bushing 214 is located over inner tube 12 and can be secured to inner tube 12 by compression of elastomeric bushing 214 and the associated friction between elastomeric bushing 214 and inner tube 12; by being bonded to inner tube 12; or by any other means known in the art. Elastomeric bushing 214 defines a pair of voids 230 which with inserts 216 define a pair of fluid chambers 232. Elastomeric bushing 214 also defines a pocket 234 within which insert 216 is located.

Insert 216 is a single piece component which defines two halves interconnected by a living hinge 236. Living hinge 236 is a thin-walled portion of insert 216. Living hinge 236 allows insert 216 to flex through a large arc thus forming a near zero cost hinge. The flexing of living hinge 236 allows for the assembly of insert 216 over elastomeric bushing 214. Insert 216 defines a pair of bump stops 238 and a fluid channel 240. Bump stops 238 limit the radial movement of inner tube 12 with respect to insert 216 and outer tube 20. Channel 240 includes a circumferential portion 242, a pair of axial portions 244 and a pair of radial portions 246. Radial portions 246 are each open to respective fluid chambers 232. Thus, one fluid chamber 232 is in fluid communication with the opposite fluid chamber 232 through one of the radial portions 246, through one of the axial portions 244, through circumferential portion 242, through the other axial portion 244 and through the other radial portion 246. During deflection of hydraulic bushing assembly 210, the flow of fluid between one chamber 232, through channel 240 creates a mass damper effect for hydraulic bushing assembly 210.

Outer tube 20 is positioned over inserts 216 and elastomeric bushing 214. Outer tube 20 closes channels 240 of insert 216 and elastomeric bushing 214 engages the inside surface of outer tube 20 to provide a seal for the fluid located within fluid chambers 232 and channel 240. The pair of intermediate tubes 18 are located within opposite end of elastomeric bushing 214 between inner tube 12 and outer tube 20. The ends of outer tube 20 are curled over as shown at 46 to trap each intermediate tube 18 between the curled end 46 and insert 216. Intermediate tubes 18 separate the inner or working part of elastomeric bushing 214 where the loads are taken from the outer part of elastomeric bushing 214 which with the inside surface of outer tube 20 provides a fluid seal for hydraulic bushing assembly 210.

While hydraulic bushing assembly 210 and insert 216 are illustrated in conjunction with curved ends 46, it is within the scope of the present invention to utilize intermediate tubes 118 with insert 216. When replacing intermediate tubes 18 with intermediate tubes 118, insert 216 would include a pair of male portions 156 of toggle lock 154 and outer tube 20 would be replaced by outer tube 120.

The inertia track is the flow path or channel 240 that resonates within hydraulic bushing assembly 210. Channel 240 is formed into the outside diameter of insert 216 and then closed by outer tube 20 or 120. Due to the compression of elastomeric bushing 214, the energization of elastomeric bushing 214 applies a force to the ends of insert 216 as illustrated by arrows 250 in FIG. 8. This force acts similar to the wheel cylinder in a leading/trailing drum brake. A relatively small force is mechanically magnified in this way to press insert 216 hard against outer tube 20 or outer tube 120. In addition, the approximately forty-five degree angle on the interface between insert 216 and elastomeric bushing 214 as illustrated at 252 in FIG. 9, is beneficial in that it enhances the distance that elastomeric bushing 214 can act through.

What is claimed is:

1. A hydraulic bushing assembly comprising:
    a single piece outer tube defining a central axis and a radial direction perpendicular to said central axis;
    an elastomeric bushing disposed within said outer tube and directly engaging an inner surface of said outer tube, said inner surface extending along said central axis of said single piece outer tube;
    an insert disposed within a pocket defined by said elastomeric bushing, said insert directly engaging said outer tube, said insert comprising a wall, the wall including a first portion, a second portion, and a third portion disposed between said first and second portions;
    a first fluid chamber defined by said elastomeric bushing and said insert, said first fluid chamber being sealed due to the direct engagement between said elastomeric bushing and said outer tube;
    a first bump stop projecting from said first portion of the wall and disposed within said first fluid chamber;
    a second fluid chamber defined by said elastomeric bushing and said insert, said second fluid chamber being sealed due to the direct engagement between said elastomeric bushing and said outer tube;
    a second bump stop projecting from said second portion of the wall and disposed within said second fluid chamber;
    a fluid passageway defined by said insert and by said outer tube, said fluid passageway extending between said first and second fluid chambers;
    a living hinge defined by said third portion of the wall, a wall thickness of said living hinge over an entire length of said living hinge in a direction parallel to said central axis being smaller than a smallest thickness of said first and second portions in said radial direction;
    a first intermediate tube disposed within said elastomeric bushing at a first axial end of said insert, a first portion of said elastomeric bushing being disposed between said first intermediate tube and said outer tube to provide a first seal for said fluid passageway; and
    a second intermediate tube disposed within said elastomeric bushing at a second axial end of said insert, said second axial end being opposite to said first axial end, a second portion of said elastomeric bushing being disposed between said second intermediate tube and said outer tube to provide a second seal for said fluid passageway.

2. The hydraulic bushing assembly according to claim 1, wherein said outer tube includes a pair of curled ends disposed at opposite terminal ends of said outer tube.

3. The hydraulic bushing assembly according to claim 1, further comprising an inner tube extending through said elastomeric bushing.

4. The hydraulic bushing assembly according to claim 1, wherein said insert is attached to said first and second intermediate tubes.

5. The hydraulic bushing assembly according to claim 1, wherein said elastomeric bushing is entirely disposed within said outer tube.

6. The hydraulic bushing assembly according to claim 1, wherein said fluid passageway includes a circumferential portion defined by said insert and said outer tube, an axial portion separate from and in communication with said circumferential portion and defined by said insert and said outer tube and a radial portion separate from and in communication with both said axial portion and said circumferential portion, said radial portion being in communication with said first fluid chamber.

7. The hydraulic bushing assembly according to claim 1, wherein said elastomeric bushing is a single piece elastomeric member having said first and second intermediate tubes disposed within said singe piece elastomeric member.

* * * * *